US012350853B1

(12) United States Patent
Joseph

(10) Patent No.: US 12,350,853 B1
(45) Date of Patent: Jul. 8, 2025

(54) CUTTING DEVICE FOR PRODUCING HAND-CUT PRODUCTS

(71) Applicant: Murlene Joseph, St. Petersburg, FL (US)

(72) Inventor: Murlene Joseph, St. Petersburg, FL (US)

( * ) Notice: Subject to any disclaimer, the term of this patent is extended or adjusted under 35 U.S.C. 154(b) by 309 days.

(21) Appl. No.: 17/882,684

(22) Filed: Aug. 8, 2022

Related U.S. Application Data

(60) Provisional application No. 63/243,543, filed on Sep. 13, 2021.

(51) Int. Cl.
*B26B 27/00* (2006.01)

(52) U.S. Cl.
CPC .................................... *B26B 27/00* (2013.01)

(58) Field of Classification Search
None
See application file for complete search history.

(56) References Cited

U.S. PATENT DOCUMENTS 2,499,309 A * 2/1950 Harris .................. A21C 11/106 30/316
3,765,282 A * 10/1973 Crain, Jr. .............. B26F 1/3846 30/316
4,010,543 A * 3/1977 Nusbaum .................. B26F 1/32 30/316
D246,412 S 11/1977 Brunner
6,823,764 B1 * 11/2004 Tsubota .................. A61F 5/445 30/360
D581,222 S 11/2008 Vendl
D587,074 S 2/2009 Casarta
D659,489 S 5/2012 Berief
D719,791 S 12/2014 Davis
D725,444 S 3/2015 Cline et al.
D725,974 S 4/2015 Cline et al.
D735,539 S 8/2015 Tandon
2014/0033544 A1 2/2014 Cline et al.

FOREIGN PATENT DOCUMENTS

KR 20110092539 A 8/2011

* cited by examiner

*Primary Examiner* — Hwei-Siu C Payer
(74) *Attorney, Agent, or Firm* — Larson & Larson; Frank Liebenow; Justin P. Miller

(57) ABSTRACT

A cutting device is capable of producing cutout portions from pliable and semi-pliable bulk materials which, in combination with an indentation tool, is used to produce products having precisely positioned holes formed therein. The cutting device includes a body having a first end with a continuous cutting edge formed therearound, a second end opposite the first end configured to be gripped by an individual, and side walls coupling the first end and the second end. The cutting edge of the first end defines an opening in the side walls and has an interior profile defining a cavity thereinbetween. One or more guide holes are formed in the second end that are configured for receiving and guiding the indentation tool therethrough.

11 Claims, 11 Drawing Sheets

CUTTING DEVICE FOR PRODUCING HAND-CUT PRODUCTS

CROSS-REFERENCE TO RELATED APPLICATIONS

This application claims the benefit of U.S. Provisional Patent Application Ser. No. 63/243,543 filed on Sep. 13, 2021, which is incorporated by reference herein in its entirety.

FIELD OF THE INVENTION

The present invention relates generally to cutting devices, and more particularly, to cutting devices having guide holes that may be used to assist in forming precisely positioned and oriented holes in hand-cut products having predetermined shapes.

BACKGROUND OF THE INVENTION

Various techniques exist for producing hand-cut products from pliable or semi-pliable materials such as clay and other unfired/uncured ceramics, leather, metal clays, plaster, and various food products such as dough and fondant. Common techniques generally include positioning a relatively flat bulk material on a surface, using a cutting tool (e.g., a knife) to cut a portion of the bulk material into a desired or predetermined shape, and removing the cutout portion from the bulk material. Thereafter, depending on the material worked upon, the cutout portion may be dried, baked, fired, and/or cured to produce a final or intermediate component. The cutout portion may be cut free hand (i.e., without a guide), however, even the most talented artisans may have difficulties reproducing components having consistent shapes with this method.

One technique for producing components having consistent shapes includes the use of templates. Templates generally include a body or sheet that may be placed on the bulk material and used as a guide while cutting the bulk material with the cutting tool. The body or sheet of the template may have an exterior profile, an interior profile, a plurality of openings, or combinations thereof along which the cutting tool may be maneuvered during the cutting process. Although templates may be used to reliably reproduce relatively complicated designs, they can be labor intensive and, depending on the complexity, may involve a certain degree of patience and dexterity.

Another technique for producing components having consistent shapes includes the use of cutting devices that do not require the use of a separate cutting tool. For example, various cutting devices are available that generally include an integrated cutting edge that may be pressed into the bulk material to cutout a portion of the bulk material that has a shape corresponding to an interior profile of the cutting edge (e.g., similar to certain types of cookie cutters). This type of cutting device may reduce the labor and skill required to product components having consistent shapes relative to templates.

These and other techniques may be used to produce final and/or intermediate components for a wide variety of end products. However, while the templates and cutting devices noted above may be useful for producing components in specific and consistent shapes, they generally are not used to assist in any post-formation processing that the components may undergo prior to their incorporation into an end product. For example, various types of handmade products, such as certain jewelry, pendants, sun catchers, and artwork, may include components integrated into the products that are bung in a suspended position. The suspended components may each have one or more holes formed therein through which an elongated member, such as a cord, string, wire, chain, etc., is inserted. In this example, it may be difficult for an artisan to precisely position and/or orient the hole(s) such that the components hang in desired positions. Any mistakes during the crafting process may result in the components hanging askew or off center.

Accordingly, there is an established need for a timesaving cutting device that could assist in post-formation processing to improve the reproducibility and quality of hand-cut components formed from pliable or semi-pliable materials.

SUMMARY OF THE INVENTION

The present invention is directed to a convenient and labor-saving cutting device that is capable of neatly, quickly and efficiently producing cutout portions from pliable and semi-pliable bulk materials that in combination with an indentation tool may be used to produce final and intermediate components having precisely positioned holes formed therein. The cutting device includes a body having a first end with a continuous cutting edge thereon, a second end opposite the first end configured to be gripped by an individual, and side walls coupling the first end and the second end. The cutting edge of the first end defines an opening in the side walls and has an interior profile. One or more guide holes are formed in the second end that are configured for receiving and guiding an indentation tool therethrough.

In a first implementation of the invention, a cutting device for use in producing hand-cut products comprises a body having a first end with a continuous cutting edge thereon, a second end opposite the first end configured to be gripped by an individual, and side walls coupling the first end and the second end. The cutting edge of the first end defines an opening in the side walls and has an interior profile. One or more guide holes are formed in the second end that are configured for receiving and guiding an indentation tool therethrough.

In a second aspect, the cutting device can include at least two guide holes each having a central longitudinal axis wherein the longitudinal axes of the at least two guide holes are parallel to each other.

In another aspect, the cutting edge of the first end may be equidistant from the second end about a circumference of the first end.

In another aspect, the longitudinal axes of the guide holes may be perpendicular to a geometric plane comprising the cutting edge of the first end.

In another aspect, the second end may have an interior edge that defines a second opening in the side walls, the body comprising a cavity that is connected by the first and second openings.

In another aspect, the second end may have at least one protruding member that is cantilevered from the interior edge of the second end over the cavity of the body, the protruding member including at least one of the one or more guide holes.

In another aspect, the second end may have at least two protruding members that are cantilevered from opposite sides of the interior edge of the second end toward each other and over the cavity of the body, each of the protruding members including at least one of the one or more guide holes.

In another aspect, the second end may at least one cross member that extends from a first side of the interior edge of the second end over the cavity of the body to a second side of the interior edge, the at least one cross member including at least one of the one or more guide holes.

In another aspect, the at least one cross member may include at least two guide holes and the at least two guide boles may be axially parallel to each other.

In another aspect, the one or more guide holes may have uniform interior cross sections that define cylindrical openings through the second end.

In another aspect, the one or more guide holes may have non-uniform interior cross sections having diameters that decrease at least partially along the longitudinal axes thereof from a first end to a second end of the one or more guide holes.

In another aspect, the non-uniform cross-sections may have diameters that decrease along the longitudinal axes thereof through an entirety of the one or more guide holes from the first end to the second end thereof.

In another aspect, a method of using the cutting device may comprise positioning a bulk material on a surface, the bulk material covering an area on the surface that is larger than an area of the interior profile of the cutting edge of the cutting device, locating the second end of the cutting device on the bulk material such that the cutting edge contacts the bulk material, applying a force to the cutting device such that the cutting edge penetrates the bulk material and separates a portion of the bulk material located within the opening of the second end of the cutting device from a remainder of the bulk material to define a cutout portion of the bulk material; and, inserting a shaft of an indentation tool into the one or more guide holes to an extent sufficient that a point on a distal end of the shaft contacts and at least partially penetrates the cutout portion of the bulk material to produce at least one indentation therein.

In another aspect, the method may include forming holes aligned with the indentations formed in the cutout portion of the bulk material.

In another aspect, the bulk material may be a clay material having a sufficient moisture content to be pliable.

In another aspect, the method may include drying, firing and/or curing the cutout portion of the bulk material to an extent sufficient to harden the cutout portion of the bulk material after forming the indentations therein to at least partially define a hardened intermediate component.

In another aspect, the method may include drilling one or more holes in the hardened intermediate component aligned with the indentations therein.

In another aspect, the method may include producing a final component either by forming one or more holes at the indentations in a hardened intermediate component that was previously fired or cured, or by firing or curing a hardened intermediate component that was previously dried and had one or more holes formed therein at the indentations.

In another aspect, the method may include inserting a cord through the one or more holes in the component and hanging the component with a cord.

In another aspect, the method may include forming at least two axially parallel holes in a hardened intermediate component at the indentations, producing a final component from the hardened intermediate component, inserting a cord through both of the at least two holes, and hanging the final component with the cord. The final component may have a center of gravity that is balanced between the at least two holes while the final component is hanging such that the at least two holes are aligned vertically or horizontally relative to gravity.

In another aspect, the method may include producing a final or intermediate component forming a piece of jewelry, pedant or sun catcher.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convenient and economical cutting device that is capable of cutting pliable, semi-pliable and/or gel-like bulk materials in an efficient, neat, and quick manner that in combination with an indentation tool may be used to produce final and intermediate components having precisely positioned holes therein. Suitable but nonlimiting bulk materials include moist unfired/uncured natural clay materials, synthetic clay materials (e.g., polymer clay), and combinations thereof, other natural and synthetic unfired/uncured ceramic materials, natural and synthetic leathers, metal clay materials, plaster materials, and various food products such as dough and fondant, just to name a few.

Figure 1:
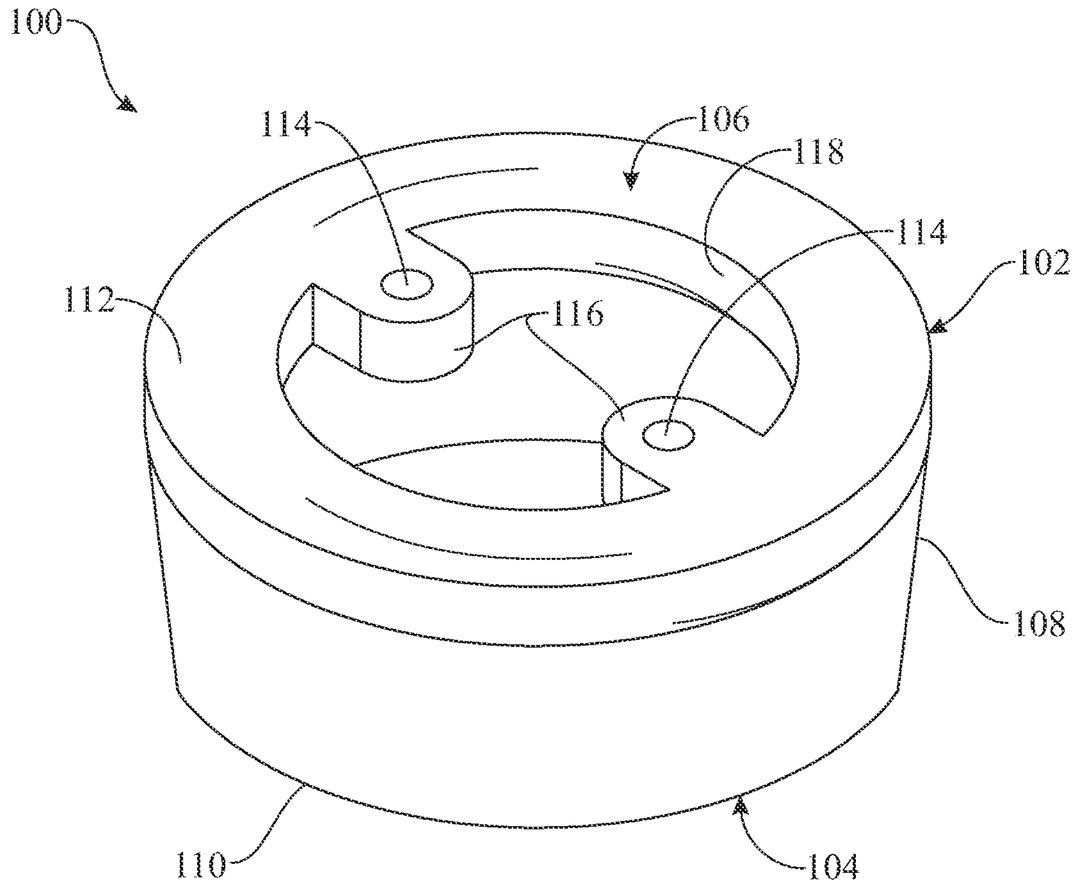
FIG. 1 presents a perspective view of a cutting device in accordance with a first embodiment of the present invention.
Figure 2:
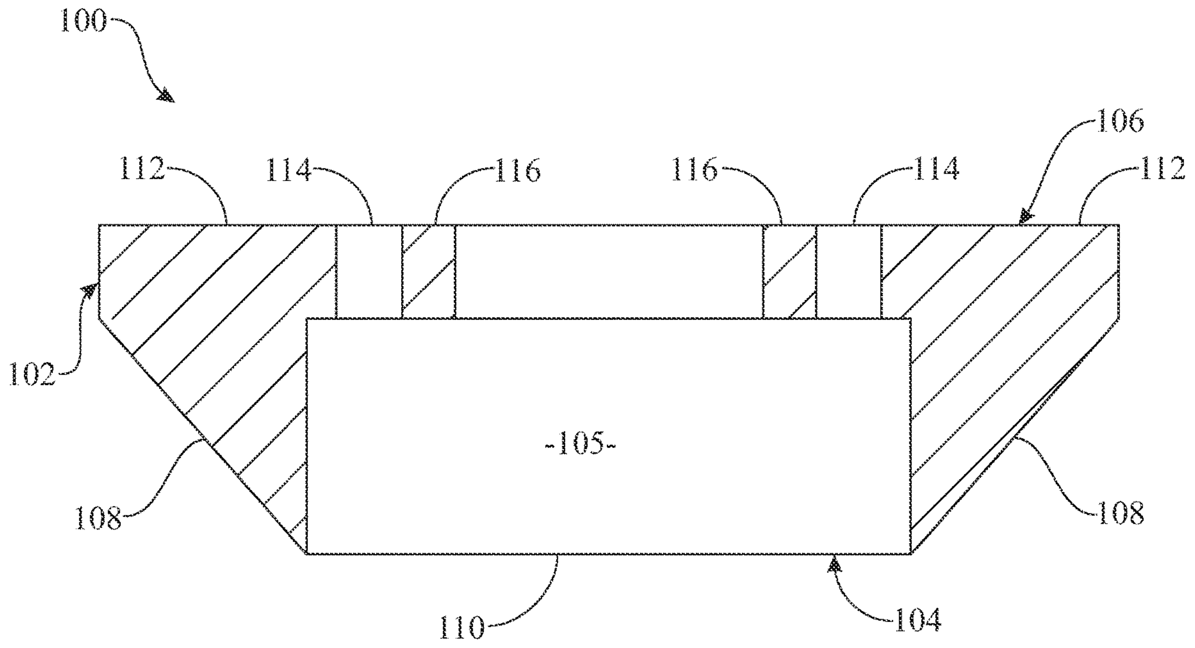
FIG. 2 presents a cross-sectional view of the cutting device of FIG. 1.

Referring initially to FIGS. 1 and 2, a cutting device for cutting a bulk material, hereinafter cutting device 100, is presented in accordance with a first nonlimiting embodiment. The cutting device 100 includes a body 102 having a first end referred to herein as the bottom 104 of the cutting device 100, a second end opposite the first end referred to herein as the top 106 of the cutting device 100, and side walls 108 between and connecting the bottom 104 and the top 106 of the cutting device 100. For clarity of the following description, the cutting device 100 will be referred to as having a central axis extending between the top 106 and the bottom 104 of the cutting device 100. In this embodiment, the top 106 and the bottom 104 of the cutting device 100 have circular exterior perimeters and, as such, the central axis of the cutting device 100 is equidistant from the exterior perimeter of the body 102 along a central longitudinal axis.

The bottom 104 of the cutting device 100 includes a continuous cutting edge 110 configured to contact and cut a pliable or semi-pliable material, such as, by way of example only, a moist unfired/uncured bulk clay material. This may be accomplished by placing an entirety of the cutting edge 110 against surface of the bulk material and forcing the cutting device 100 in a downward direction toward the bulk material such that the cutting edge 110 penetrates into and through the bulk material. To promote this action, the top 106 of the cutting device 100 includes an upper surface 112 against which an individual may press down upon. To further promote ease of use, the top 106 of the cutting device 100 may be configured to be gripped and held by with a hand of the individual during use of the cutting device 100. In this instance, the top 106 of the cutting device 100 is substantially thicker than the bottom 104 to promote a secure grip. In certain embodiments, the top 106 may include a lip (not shown) that protrudes outward away from the central axis and overhangs the side walls 108 and/or may include an array of recesses and/or protuberances configured to promote a secure grip on the top 106 of the cutting device 100.

The cutting edge 110 defines an opening in the bottom 104 of the cutting device 100 between the side walls 108. When the cutting edge 110 is used to cut a portion from a bulk material, the resulting cutout portion preferably has an outer perimeter corresponding in shape to an interior profile of the cutting edge 110. A cavity 105 is provided through the body 102 between the side walls 108 that allows for the bulk material to be cut with the cutting edge 110 without otherwise deforming the resulting cutout portion, that is, sufficient space is provided between the top 106 and the bottom 104 to allow the bulk material to enter a cavity 105 in the cutting device 100 as the cutting edge 110 and adjacent side walls 108 penetrate the bulk material. Although not required, in at least one embodiment, the top 106 includes an opening between surfaces of an interior edge 118 thereof that provides access to the cavity 105 between the openings at the bottom 104 and top 106 of the cutting device 100. The opening in the top 106 may reduce the likelihood of the cutout portion becoming stuck within the cavity 105 due to suction forces.

The cutting device 100 includes one or more guide holes 114 that are configured for receiving and guiding an indentation tool 508 therethrough for producing indentations in the cutout portion. In certain embodiments, the cutting device 100 may include at least two guide holes 114 that are axially parallel to each other. That is, each of the guide holes 114 have a central longitudinal axis and the longitudinal axes of the guide holes 114 are parallel to each other. In the embodiment of FIGS. 1 and 2, the cutting edge 110 is substantially equidistant from the upper surface 112 of the top 106 about the circumferences thereof. In such an embodiment, the longitudinal axes of the guide holes 114 may be perpendicular to a geometric plane comprising the cutting edge 110. In other words, if the cutting edge 110 is rested on a flat, planar surface, the longitudinal axes of the guide holes 114 may be perpendicular to the planar surface. When the indentation tool 508 is inserted into the guide holes 114, this arrangement may promote the indentation tool precisely contacting the bulk clay material with the tip or point thereof.

In the embodiment of FIGS. 1 and 2, the top 106 of the cutting device 100 includes a pair of protruding members 116 that are each cantilevered from the interior edge 118 of the top 106, such that the protruding members 116 each overhang the cavity 105 of the body 102. Each of the protruding members 116 includes a guide hole 114 formed therethrough. Although not required, the protruding members 116 are located on opposite sides of the interior edge 118 of the top 106 of the cutting device 100, and their respective guide holes 114 are axially parallel to each other as well as being laterally and longitudinally equidistant from the cutting edge 110 relative to one other. Alternatively, the cutting device 100 could include fewer or more protruding members 116 each including one or more guide holes 114 therein, could include two or more protruding members 116 each having one or more guide holes 114 that are uniformly or non-uniformly spaced apart about the top 106, or could include two or more protruding members 116 each having one or more guide holes 114 that are not laterally and/or longitudinally equidistant from the cutting edge 110 relative to each other.

Figure 3:
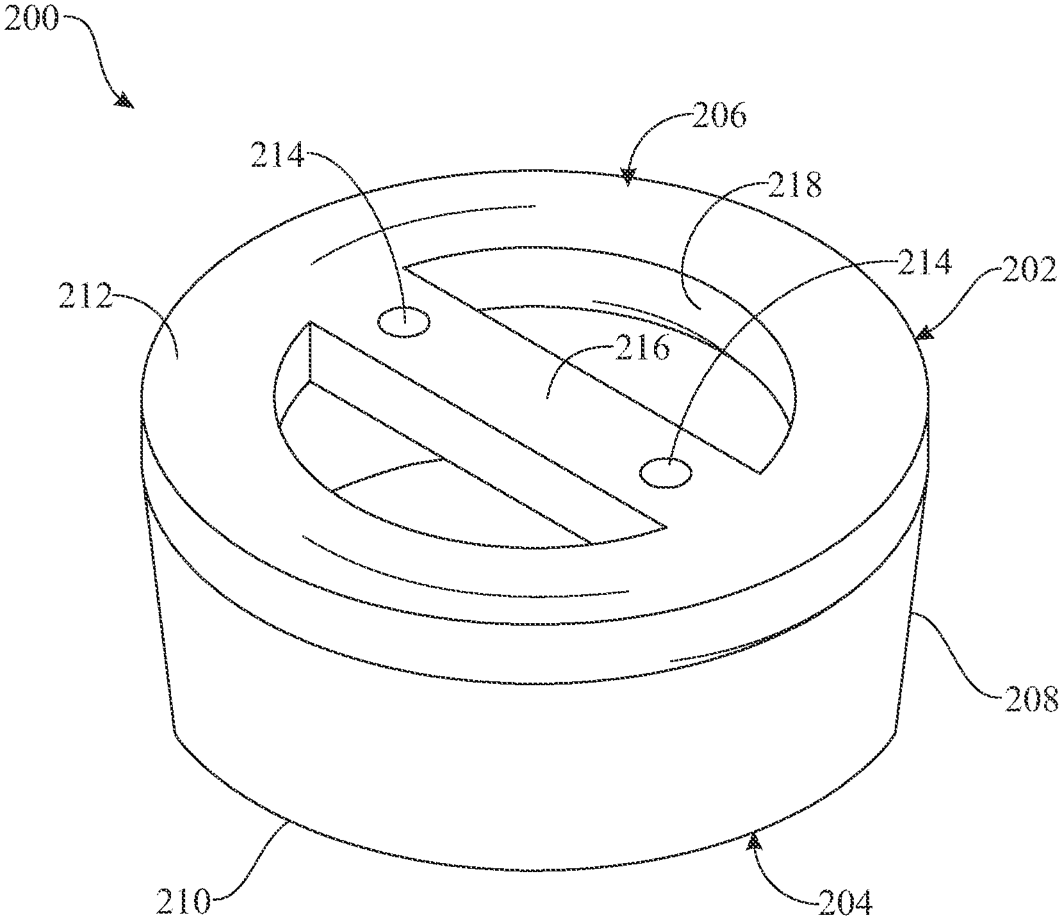
FIG. 3 presents a perspective view of a cutting device in accordance with a second embodiment of the present invention.
Figure 4:
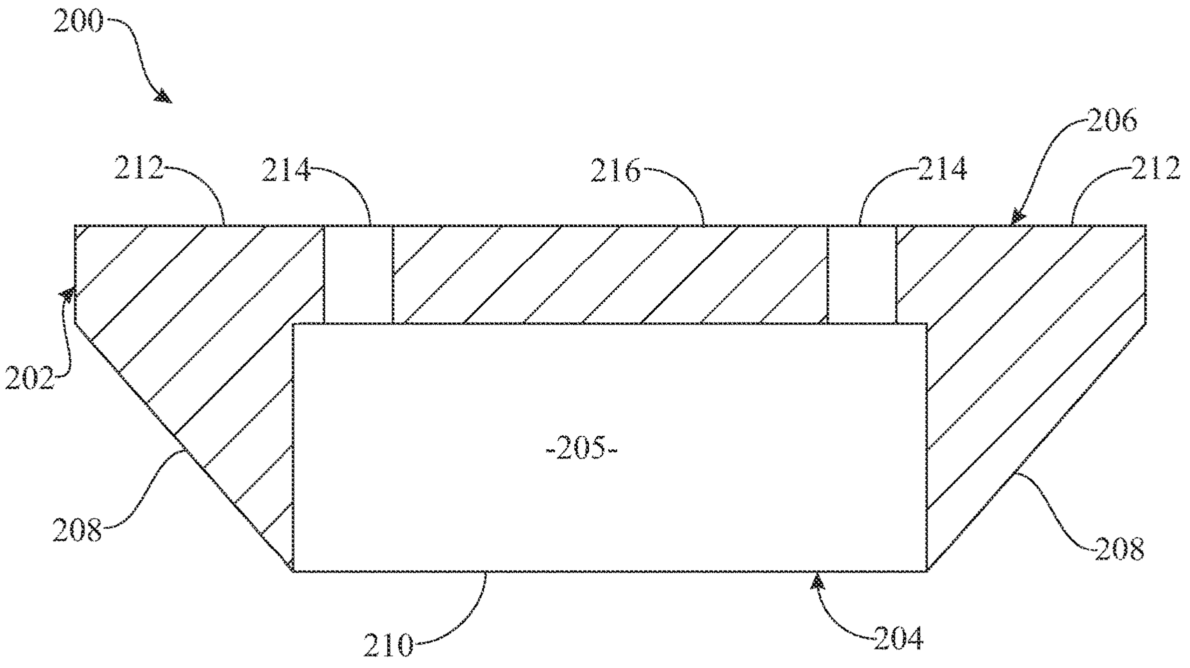
FIG. 4 presents a cross-sectional view of the cutting device of FIG. 3.
Figure 5:
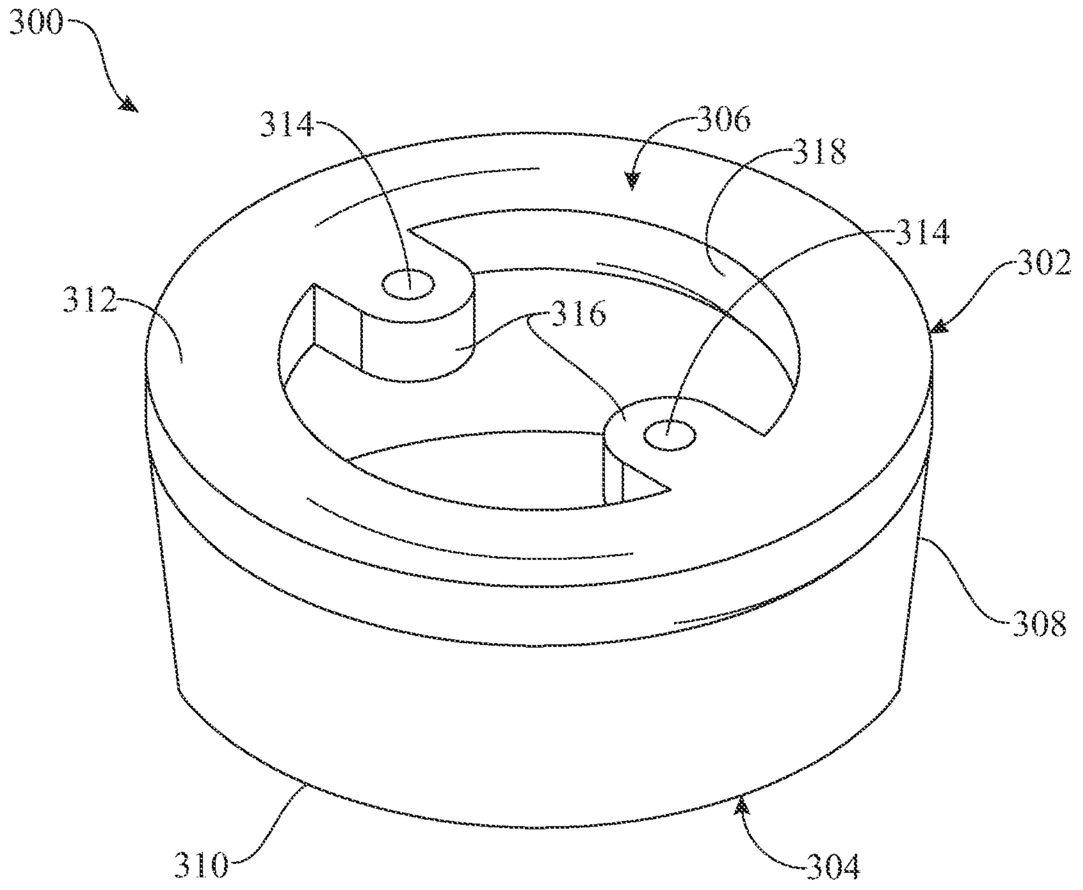
FIG. 5 presents a perspective view of a cutting device in accordance with a third embodiment of the present invention.
Figure 6:
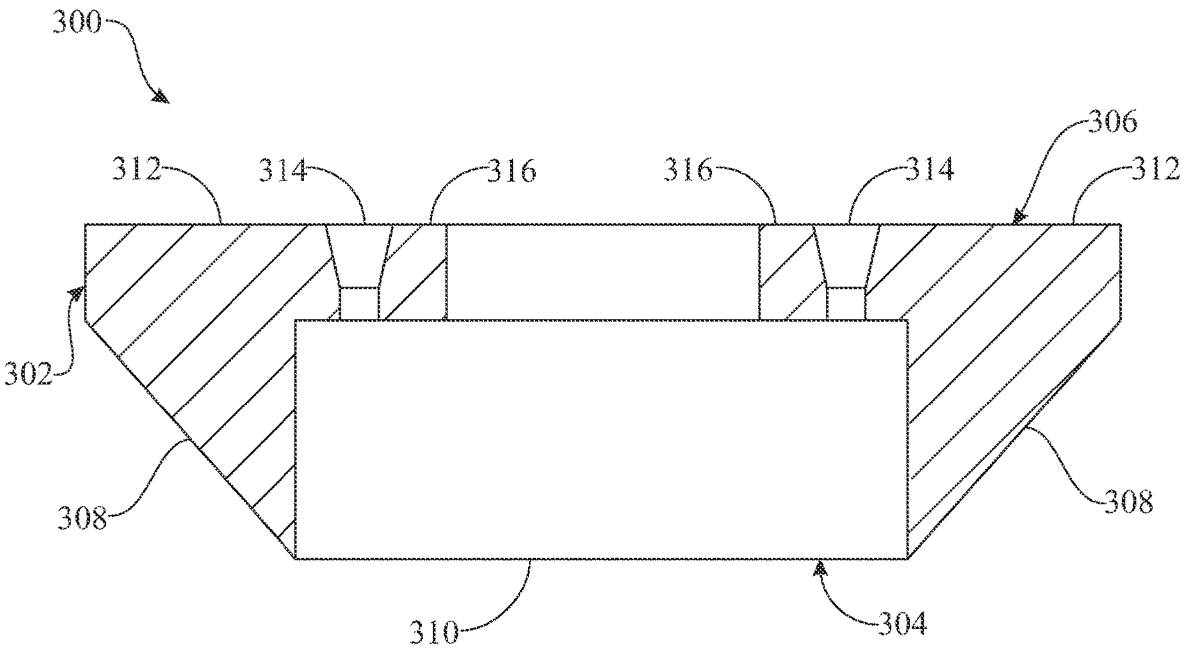
FIG. 6 presents a cross-sectional view of the cutting device of FIG. 5.
Figure 7:
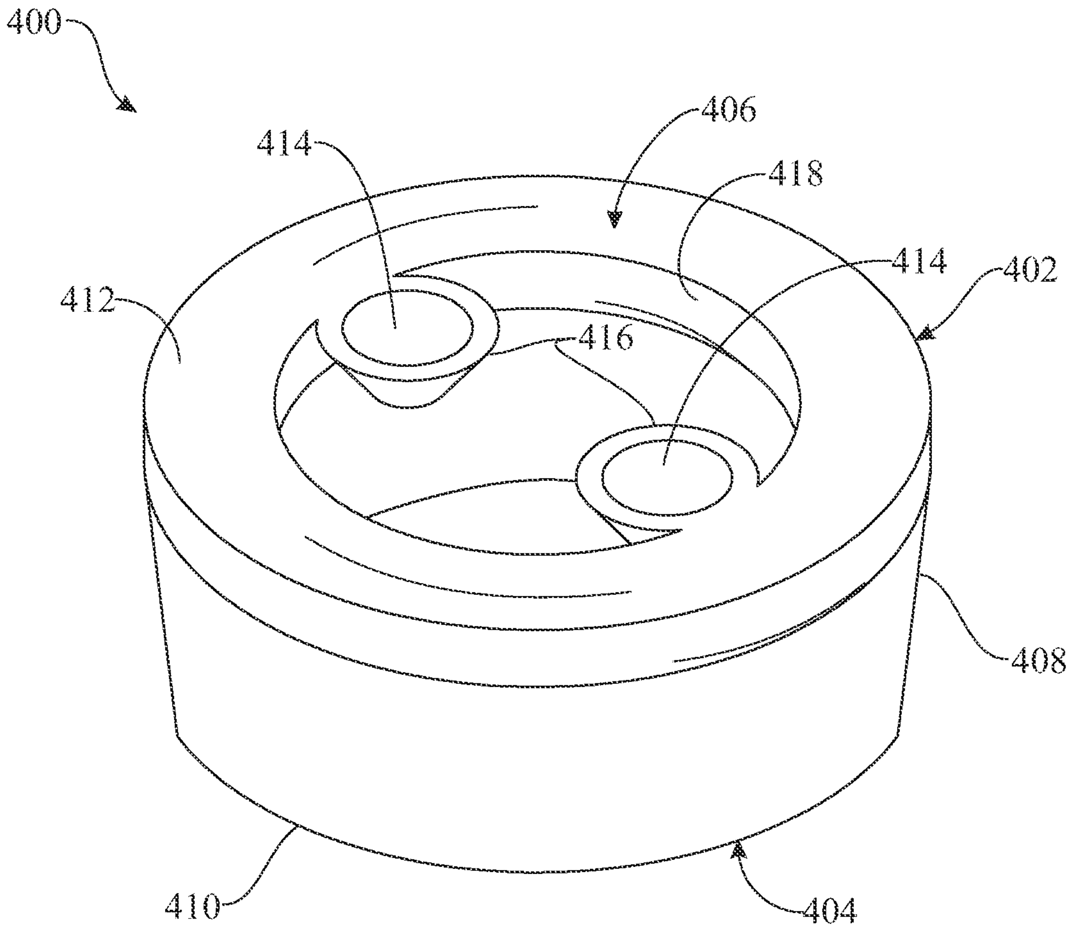
FIG. 7 presents a perspective view of a cutting device in accordance with a fourth embodiment of the present invention.
Figure 8:
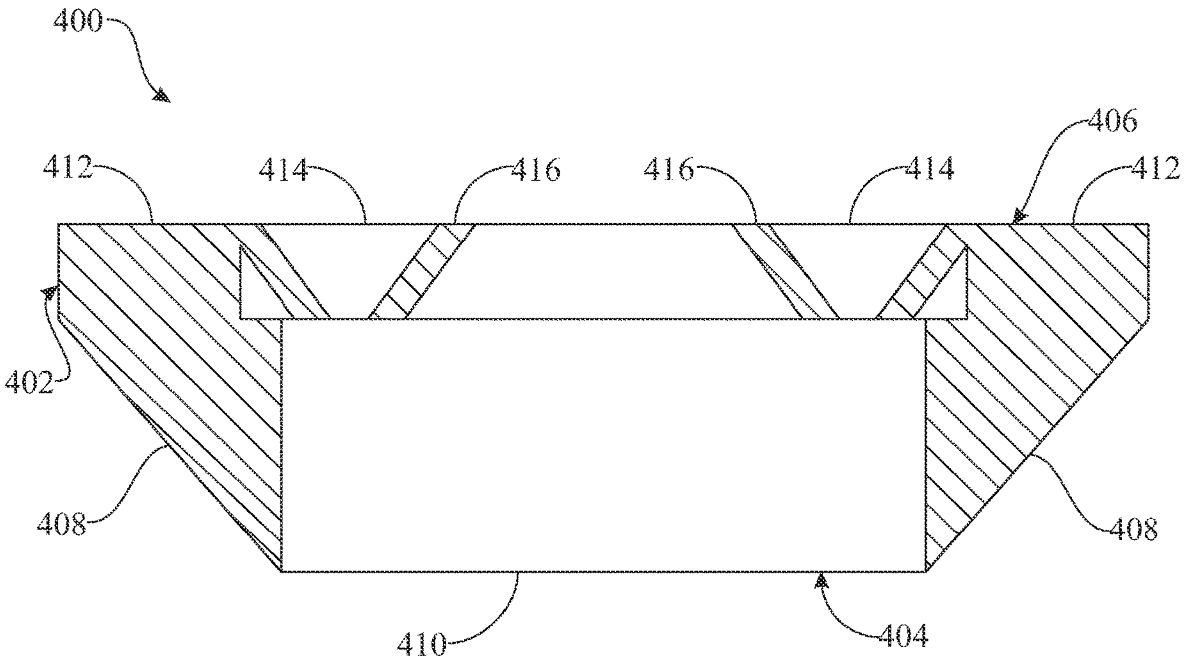
FIG. 8 presents a cross-sectional view of the cutting device of FIG. 7.

The present invention is amenable to a number of other embodiments, for example: FIGS. 3 and 4 present a cutting device for cutting pliable and semi-pliable materials, hereinafter cutting device 200, in accordance with a second nonlimiting embodiment; FIGS. 5 and 6 present a cutting device for cutting pliable and semi-pliable materials, hereinafter cutting device 300, in accordance with a third nonlimiting embodiment; and, FIGS. 7 and 8 present a cutting device for cutting pliable and semi-pliable materials, hereinafter cutting device 400, in accordance with a fourth nonlimiting embodiment. In view of similarities with the first embodiment, the following discussion of the additional embodiments will focus primarily on aspects of the additional embodiments that differ from the first embodiment in some notable or significant manner. Other aspects of the additional embodiments not discussed in any detail can be, in terms of structure, function, materials, etc., essentially as was described for the first embodiment. In these figures, consistent reference numbers are used to identify the same or functionally related/equivalent elements, but with a numerical prefix (e.g., 2, 3 or 4) added to distinguish the particular embodiment of the cutting device.

Referring to FIGS. 3 and 4, the cutting device 200 has a body 202 that is constructed in a manner that is substantially similarly to the body 102 of the cutting device 100 of FIGS. 1 and 2. However, in this embodiment the protruding members 116 are replaced with an elongated cross member 216 that extends from a first side of the interior edge 218 of the top 206 over the cavity 205 of the body 202 to a second side of the interior edge 218. The cross member 216 has a central longitudinal axis that radially aligns with a diameter of the top 206 of the cutting device 200. A pair of guide holes 214 in the cross member 216 are axially parallel to each other, as well as laterally and longitudinally equidistant from the cutting edge 210 relative to each other, and centered along the cross member 216 (e.g., the longitudinal axes of the guide holes 214 pass through the central longitudinal axis of the cross member 216). Alternatively, the longitudinal axis of the cross member 216 may be aligned with a cord of the top 206 of the cutting device 200 that is not aligned with a diameter thereof, that is, does not pass through the central longitudinal axis of the body 202 (e.g., center of the top 206). Furthermore, the cutting device 200 could include more than one cross member 216 each having one or more guide hole 214, or it could include two or more guide holes 214 in the cross member 216 that are not laterally and/or longitudinally equidistant from the cutting edge 210, or it could include one or more guide holes 214 that are offset from the central longitudinal axis of the cross member 216 (e.g., the guide holes 214 have longitudinal axes that do not pass through the central longitudinal axis of the cross member 216).

The cutting devices 100 and 200 of the first and second embodiments both include guide holes 114, 214 that have uniform interior cross-sections that define cylindrical openings through the protruding members 116 or the cross member 216, respectively (FIGS. 2 and 4). However, the guide holes 114, 214 of the cutting device 100, 200 are not limited to any one particular cross-sectional shape. For example, as presented in FIGS. 6 and 8 the cutting devices 300, 400 include guide holes 314, 414, respectively, having interior cross-sections with diameters that decrease at least partially from a first end (i.e., top ends of guide holes 314, 414) to a second end (i.e., bottom ends of guide holes 314, 414) thereof.

Referring to FIGS. 5 and 6, the cutting device 300 has a body 302 that is constructed in a manner that is substantially similarly to the body 102 of the cutting device 100 of FIGS. 1 and 2. However, in this embodiment, the cutting device 300 includes a pair of guide holes 314 in protruding members 316 that have cross-sections that transition along the longitudinal axes of the guide holes 314 from a first diameter at the top ends thereof to a second diameter at the bottom ends thereof. In at least one embodiment, the first diameter is larger than the second diameter. Notably, the transition between the first and second diameters is not uniform through an entirety of the guide holes 314 (i.e., the rate of change in the diameter is not constant along the longitudinal axes of the guide holes 314). Instead, the guide holes 314 uniformly transition from the first diameter at the top ends thereof to the second diameter at a location along the longitudinal axes of the guide holes 314 that is between the top and bottom ends thereof (e.g., about two-thirds of the distance from the top ends to the bottom ends thereof), and then the second diameter is maintained along the remainder of the guide holes 314 to the bottom ends thereof.

Referring to FIGS. 7 and 8, the cutting device 400 has a body 402 that is constructed in a manner that is, once again, substantially similarly to the body 102 of the cutting device 100 of FIGS. 1 and 2. However, in this embodiment the cutting device 400 includes a pair of guide holes 414 in protruding members 416 that have cross-sections that uniformly transition along an entirety of the longitudinal axes of the guide holes 414 from a first diameter at the top ends thereof to a second diameter at the bottom ends thereof. Again, in at least one embodiment, the first diameter is larger than the second diameter. In this example, the protruding members 416 have exterior surfaces that are shaped to correspond to the cross-sectional shape of the guide holes 414. That is, the exterior surfaces of the protruding members 416 uniformly transition from a first exterior diameter thereof to a second exterior diameter thereof at a rate of change (e.g., slope or angle) that is the same as the rate of change of the interior diameter of the guide holes 414. This structural feature may reduce the material costs of the cutting device 400.

Figure 9:
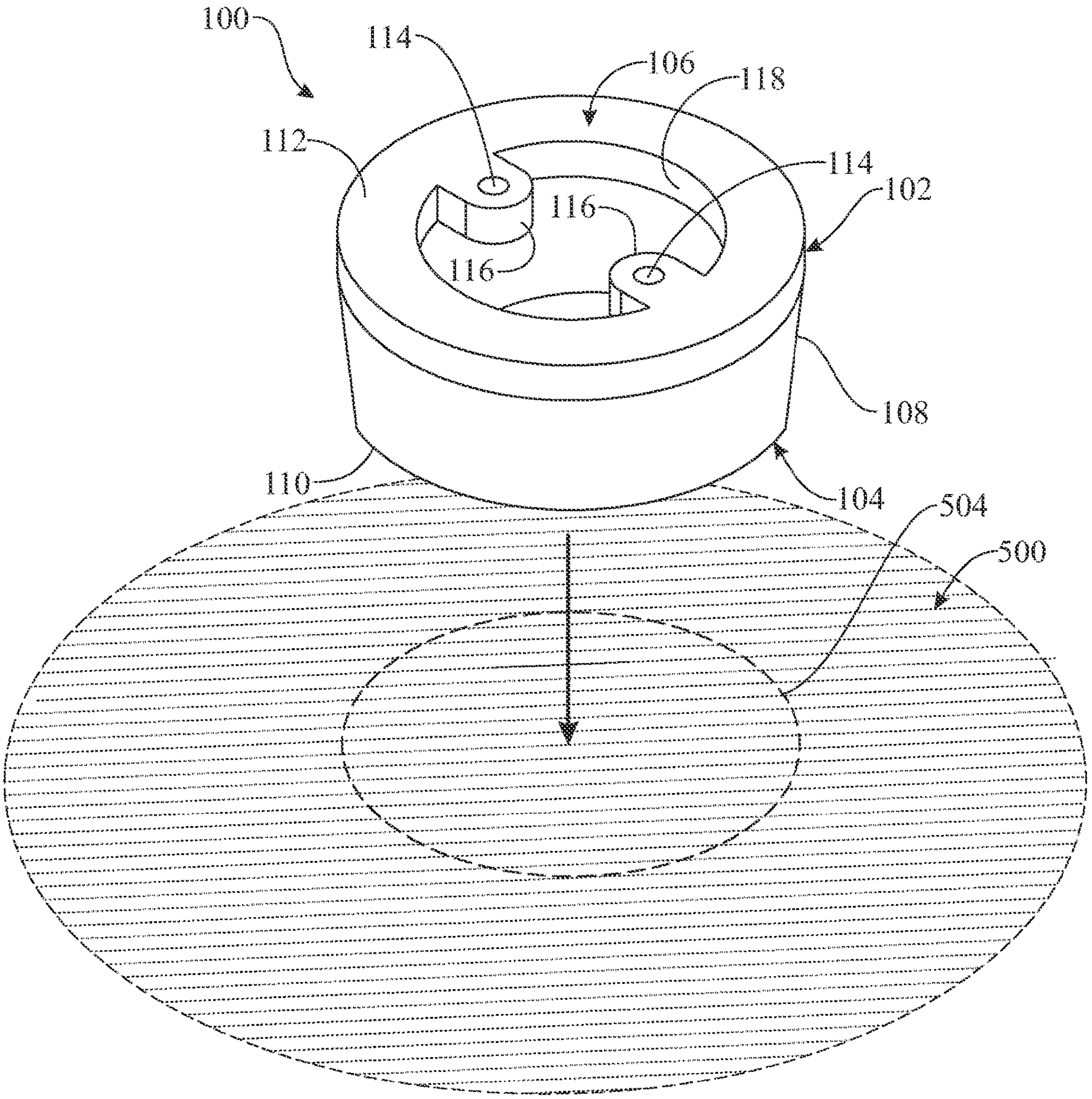
FIG. 9 presents a perspective view of the cutting device of FIGS. 1 and 2 illustrating a method of cutting a bulk material with the cutting device.
Figure 10:
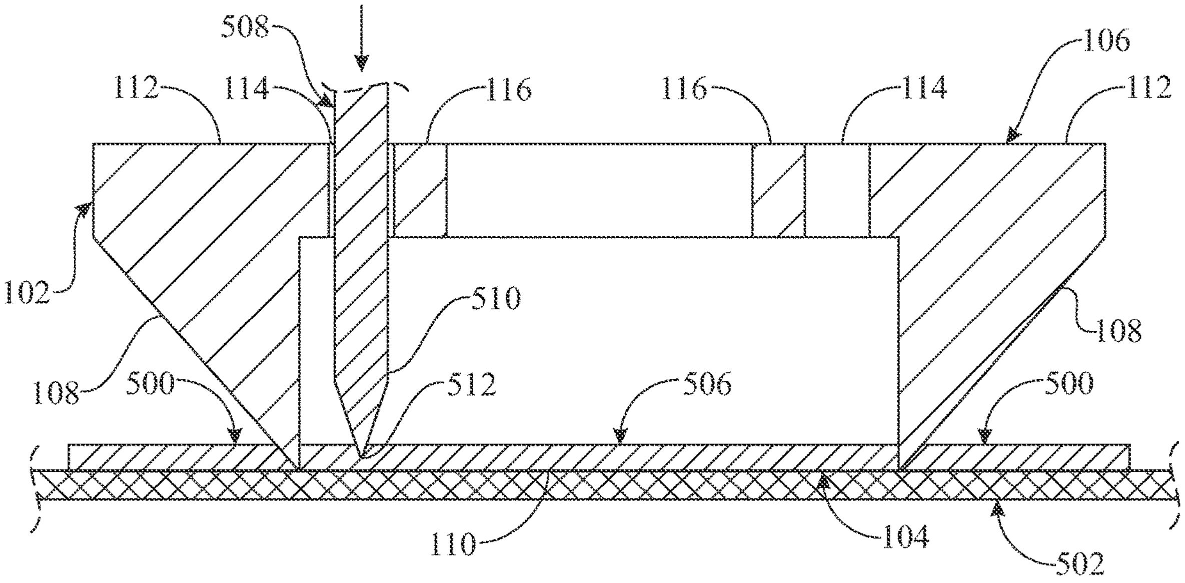
FIG. 10 presents a cross-sectional view of the cutting device of FIGS. 1 and 2 illustrating a method of forming indentations in the bulk material with the cutting device and an indentation tool.
Figure 11:
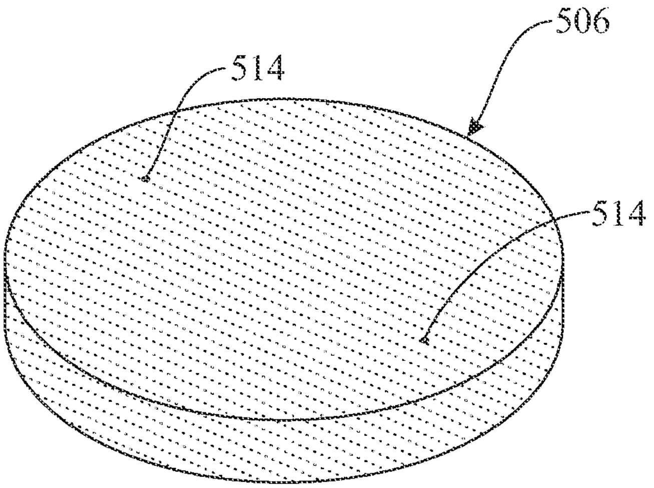
FIG. 11 presents a perspective view of a cutout portion of the bulk material formed with the cutting device of FIGS. 1 and 2, and having indentations formed therein with the indentation tool of FIG. 10 using the method illustrated in FIGS. 9 and 10.

FIGS. 9 through 11 are illustrative of the various aspects of an exemplary but nonlimiting method of using the cutting device 100 of the first embodiment to produce a final or intermediate component. Although the method is described in relation to using the cutting device 100 of the first embodiment, it should be understood that the cutting devices 200, 300, and 400 of the second, third, and fourth embodiments may be used in substantially the same or similar manner.

FIG. 9 presents a bulk material 500 spread over an underlying surface 502. The cutting device 100 is located above the bulk material 500 and oriented such that the cutting edge 110 is directed toward the bulk material 500. Preferably, the bulk material 500 is pliable, semi-pliable, or has a gel-like consistency. (for example, a clay material with a sufficient moisture content to be pliable) and a surface area over the underlying surface 502 that is larger than an area of the opening in the bottom 104 of the cutting device 100. To produce a cutout portion 506 from the bulk material 500, the cutting device 100 may be lowered such that the cutting edge 110 contacts a surface of the bulk clay material 500, for example, at a location represented by the dashed circular line 504 below the cutting device 100 in FIG. 9. The cutting device 100 may then be pressed downwardly toward the bulk material 500 such that the cutting edge 110 and adjacent portions of the side walls 108 penetrate the bulk material 500 until the cutting edge 110 contacts the underlying surface 502 below the bulk material 500, as shown best in FIG. 10. The cutting device 100 may be manually pressed solely using the artisan's own strength or may be pressed with the use of a hand tool such as a hand press or an arbor press. Since the cutting edge 110 is continuous, a portion of the bulk material 500 located within the opening of the bottom 104 of the cutting device 100 is entirely separated from a remainder of the bulk material 500 to define the cutout portion 506.

While the cutting device 100 is maintained in this position, an indentation tool 508 having an elongated shaft 510 with a point 512 at a distal end thereof may be selectively inserted into one or more of the guide holes 114 to an extent sufficient that the point 512 of the indentation tool 508 contacts and at least partially penetrates the cutout portion 506. In this example, the indentation tool 508 partially penetrates the cutout portion 506 to produce an indentation 514 in the cutout portion 506, as shown in FIG. 11. Alternatively, the indentation tool 508 may be used to entirely penetrate the cutout portion 506 and contact the underlying surface 502 therebelow to produce a hole in the cutout portion 506. After an indentation 514 has been produced, the indentation tool 508 and the cutting device 100 may be removed from the bulk material 500. FIG. 11 presents an isolated view of the resulting cutout portion 506 formed with the cutting device 100 and the indentation tool 508 having a pair of indentations 514 formed therein corresponding to the locations of the guide holes 114 of the cutting device 100.

Figure 12:
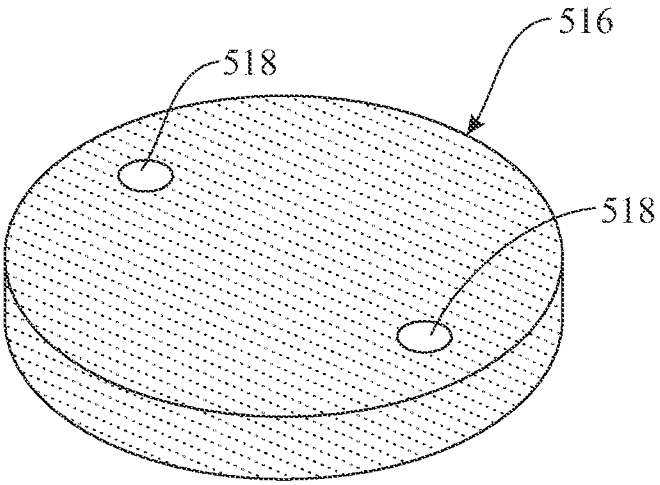
FIG. 12 presents a perspective view of a final component having a pair of axially parallel holes therein produced by drying, firing and/or curing the cutout portion of the bulk material of FIG. 11 to define a hardened intermediate component and holes drilled therein at the indentations of the hardened intermediate component.

The cutout portion 506 may then be dried, baked, fired or cured to harden the cutout portion 506 and thereby define a hardened intermediate component. After hardening, an additional tool, such as a drill (not shown), may be used to form holes in the intermediate component using the indentations 514 therein as guiding markers (e.g., the resulting holes are axially aligned with their respective indentations 514 formed through guide holes 114 of the cutting device 100 with the indentation tool 508). If the intermediate component was previously fired or cured, formation of the holes 518 produces a final component 516 as represented in FIG. 12. Alternatively, if the intermediate component was previously only dried but not fired or cured, the intermediate component having the holes therein may be fired or cured to produce the final component 516 having the holes 518 therein.

Preferably, this method allows for final and intermediate components to be produced that have one or more holes therein that are in desirable positions. For example, the final components may be in pieces of jewelry, pedants, sun catchers, artwork, or other products that are intended to be hung. In such nonlimiting examples, the method discussed in relation to FIGS. 9 through 11 may further include inserting an elongated member such as a cord, string, wire, chain, or other suitable elongated member through the holes 518 and hanging the final component 516 with the elongated member. A particular benefit of using the cutting device to produce the final and/or intermediate components may include the capability for precisely positioning and orienting the holes therein. For example, if the method results in the final component 516 having two axially parallel and precisely positioned holes 518, it is possible to ensure or increase the likelihood of the final component 516 having a center of gravity that is balanced between the holes 518 while the final component 516 is hanging such that the holes 518 are aligned vertically or horizontally relative to gravity. This may promote ease of producing hand-made products such as hung jewelry, pendants, sun catchers, etc. from the final and/or intermediate components that hang in a predetermined orientation.

Alternative embodiments are contemplated in addition the embodiments(s) shown and/or described herein. For example, the cutting device could differ in appearance and construction from the embodiments described herein and shown in the figures while maintaining the functionality described herein. For example, the cutting devices 100, 200, 300, and 400 of the first, second, third, and fourth embodiments, respectively, are all represented in the figures as having a substantially circular or conical cross-section, however, a cutting device in accordance with the present invention is not limited to such constructions. In certain embodiments, the interior profile of the cutting edge may have a cross-sectional shape corresponding to substantially any closed, two-dimensional shape. For example, the interior profile may define a triangle, a circle, a semi-circle, an oval, a crescent, a square, a rectangle, a parallelogram, a rhombus, a trapezium, a kite, or various polygons (e.g., pentagon, hexagon, octagon, nonagon, decagon, etc.). Alternatively, the interior profile may define a shape that represents a specific symbol or picture such as a letter, number, person, animal, plant, or other object. In yet other embodiments, the interior profile may define an abstract, organic, or freeform shape. In certain embodiments, the cross-sectional shapes of the top and the bottom of the cutting device may or may not match each other.

The embodiments presented in the figures have side walls with interior surfaces that are parallel to the longitudinal axis of the cutting device and exterior surfaces that uniformly transition from a first diameter of the top of the cutting device to a second diameter of the bottom thereof (e.g., transition from a first thickness of the top to a second thickness of the bottom). Alternatively, the side walls of the cutting device may have a uniform thickness along the central longitudinal axis of the cutting device or may have non-uniform transitions between the top and the bottom of the cutting device.

Various materials may be used in the manufacturing of the cutting device including certain polymeric, metallic, ceramic or composite materials. In certain embodiments, the cutting device may include materials that are commonly used for manufacturing clay cutting devices, such as certain polymeric materials (e.g., high-density polyethylene (HDPE), polyvinyl chloride (PVC), etc.) and certain metallic materials (e.g., aluminum, stainless steel, etc.). In at least one embodiment, a cutting device in accordance with the present invention includes materials of construction that are sufficiently rigid to cut pliable or semi-pliable bulk materials, such as moist unfired/uncured bulk clay materials.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A cutting device operable by a user to produce a component from a pliable or semi-pliable bulk material, comprising:

a body having a first end with a cutting edge disposed thereon, a second end opposite said first end configured to be gripped by the user, and side walls connecting said first end and said second end;

said cutting edge at least partially defining a first opening formed between said side walls;

at least one guide hole formed through a portion of said second end dimensioned and configured to receive and guide an indentation tool therethrough;

wherein said second end has at least one protruding member cantilevered from an interior edge of said second end and disposed over a cavity in said body, said at least one protruding member including said at least one guide hole formed therethrough.

2. The cutting device as recited in claim 1, wherein said cutting edge of said first end is equidistant from said second end about a circumference of said first end.

3. The cutting device as recited in claim 1, wherein the interior edge that defines a second opening between said side walls, the cavity being at least partially defined between said first opening and said second opening.

4. The cutting device as recited in claim 1, wherein said first opening formed between said side walls at least partially defines an interior profile thereof.

5. The cutting device as recited in claim 4, wherein said interior profile comprises a geometric configuration.

6. The cutting device as recited in claim 5, wherein said geometric configuration comprises a circular configuration.

7. The cutting device as recited in claim 1, wherein said at least one guide hole includes at least two guide holes each having a central longitudinal axis wherein said central longitudinal axes are disposed substantially parallel to one another.

8. The cutting device as recited in claim 7, wherein said central longitudinal axes are disposed substantially perpendicular to a geometric plane along and across said cutting edge of said first end.

9. The cutting device as recited in claim 1, wherein said at least one guide hole has a uniform interior cross-section that at least partially defines a cylindrical opening through said second end.

10. The cutting device as recited in claim 1, wherein said at least one guide hole has a non-uniform interior cross-section having a diameter that decreases at least partially along a central longitudinal axis thereof through said at least one guide hole.

11. A cutting device operable by a user to produce a component from a pliable or semi-pliable bulk material, comprising:

a body having a first end with a cutting edge disposed thereon, a second end opposite said first end configured to be gripped by the user, and side walls connecting said first end and said second end;

said cutting edge at least partially defining a first opening formed between said side walls:

at least one guide hole formed through a portion of said second end dimensioned and configured to receive and guide an indentation tool therethrough; and wherein said at least one guide hole includes at least two guide holes each having a central longitudinal axis wherein said central longitudinal axes are disposed substantially parallel to one another;

wherein said second end has at least two protruding members each cantilevered from opposite sides of an interior edge of said second end and oppositely disposed from one another over a cavity in said body, each of said at least two protruding members including at least one of said at least two guide holes formed therethrough.

* * * * *